(12) United States Patent
Clark et al.

(10) Patent No.: US 11,761,343 B2
(45) Date of Patent: Sep. 19, 2023

(54) BOAS CARRIER WITH DOVETAIL ATTACHMENTS

(71) Applicant: United Technologies Corporation, Farmington, CT (US)

(72) Inventors: Thomas E. Clark, Sanford, ME (US); William M. Barker, North Andover, MA (US)

(73) Assignee: RTX CORPORATION, Farmington, CT (US)

( * ) Notice: Subject to any disclaimer, the term of this patent is extended or adjusted under 35 U.S.C. 154(b) by 469 days.

(21) Appl. No.: 16/352,114

(22) Filed: Mar. 13, 2019

(65) Prior Publication Data
US 2020/0291803 A1    Sep. 17, 2020

(51) Int. Cl.
F01D 11/08    (2006.01)

(52) U.S. Cl.
CPC .......... F01D 11/08 (2013.01); *F05D 2240/55* (2013.01); *F05D 2260/30* (2013.01); *F05D 2300/6033* (2013.01)

(58) Field of Classification Search
CPC .......... F01D 11/08; F01D 25/28; F01D 25/24; F01D 25/246; F01D 9/042; F01D 11/005; F05D 2260/30; F05D 2300/6033; F05D 2240/55; F05D 2240/11; F05D 2230/642; Y02T 50/60
See application file for complete search history.

(56) References Cited

U.S. PATENT DOCUMENTS

| | | | | |
|---|---|---|---|---|
| 3,085,398 A * | 4/1963 | Ingleson | .................. | F01D 11/22 415/127 |
| 3,391,904 A * | 7/1968 | Albert | ..................... | F01D 11/08 415/173.1 |
| 4,251,185 A * | 2/1981 | Karstensen | ............. | F01D 11/08 415/113 |
| 4,527,385 A * | 7/1985 | Jumelle | ................... | F01D 11/18 60/806 |
| 4,728,257 A * | 3/1988 | Handschuh | ............. | F01D 11/24 415/136 |
| 5,228,828 A * | 7/1993 | Damlis | ................... | F01D 11/22 415/173.2 |

(Continued)

FOREIGN PATENT DOCUMENTS

| | | | | |
|---|---|---|---|---|
| CA | 3000376 A1 * | 11/2018 | ............. | F01D 9/042 |
| EP | 3587751 | 1/2020 | | |

(Continued)

OTHER PUBLICATIONS

Extended EP Search Report for EP Application No. 20159623.6 dated Aug. 28, 2020.

(Continued)

*Primary Examiner* — J. Todd Newton
*Assistant Examiner* — Wayne A Lambert
(74) *Attorney, Agent, or Firm* — Carlson, Gaskey & Olds, P.C.

(57) ABSTRACT

A blade outer air seal assembly includes a support structure. A blade outer air seal has a plurality of seal segments arranged circumferentially about an axis and mounted in the support structure by a carrier. The carrier has first and second hooks that extend radially outward from a platform along an axial length of the carrier. The first and second hooks are in engagement with the support structure.

24 Claims, 5 Drawing Sheets

(56) References Cited

U.S. PATENT DOCUMENTS

| | | | | |
|---|---|---|---|---|
| 5,593,278 | A * | 1/1997 | Jourdain | F01D 11/18 415/116 |
| 5,618,161 | A * | 4/1997 | Papageorgiou | F01D 9/042 415/190 |
| 5,964,575 | A * | 10/1999 | Marey | F01D 25/12 415/115 |
| 6,200,091 | B1 * | 3/2001 | Bromann | F01D 11/18 415/173.1 |
| 6,406,256 | B1 * | 6/2002 | Marx | F01D 11/16 415/138 |
| 6,514,041 | B1 * | 2/2003 | Matheny | F01D 11/18 415/177 |
| 6,666,645 | B1 * | 12/2003 | Arilla | F01D 11/24 415/116 |
| 6,733,235 | B2 | 5/2004 | Alford et al. | |
| 7,052,235 | B2 * | 5/2006 | Alford | F01D 9/04 415/173.1 |
| 8,716,623 | B2 * | 5/2014 | Lutjen | B23K 31/02 219/121.64 |
| 9,458,726 | B2 | 10/2016 | Lamusga et al. | |
| 10,087,784 | B2 | 10/2018 | Shapiro et al. | |
| 10,196,918 | B2 * | 2/2019 | McCaffrey | F01D 25/24 |
| 11,015,473 | B2 * | 5/2021 | Barker | F01D 11/08 |
| 2005/0271505 | A1 * | 12/2005 | Alford | F01D 25/246 415/173.1 |
| 2013/0192257 | A1 * | 8/2013 | Horine | F02C 7/20 60/796 |
| 2014/0223920 | A1 * | 8/2014 | Stevens | F01D 25/246 29/888 |
| 2014/0271145 | A1 * | 9/2014 | Thomas | F01D 11/24 415/173.1 |
| 2016/0215645 | A1 * | 7/2016 | McCaffrey | F01D 11/08 |
| 2016/0222828 | A1 * | 8/2016 | McCaffrey | F01D 25/24 |
| 2016/0258304 | A1 * | 9/2016 | Sippel | F01D 25/246 |
| 2016/0319840 | A1 * | 11/2016 | Riley | F01D 9/042 |
| 2016/0319841 | A1 * | 11/2016 | McCaffrey | F01D 25/246 |
| 2016/0333715 | A1 * | 11/2016 | McCaffrey | F04D 29/164 |
| 2017/0002674 | A1 * | 1/2017 | Vetters | F01D 25/246 |
| 2017/0067354 | A1 * | 3/2017 | McCaffrey | F01D 11/08 |
| 2017/0089325 | A1 | 3/2017 | Jiping | |
| 2017/0089353 | A1 * | 3/2017 | Zhang | F04D 29/541 |
| 2017/0268363 | A1 * | 9/2017 | McCaffrey | F01D 11/08 |
| 2017/0268368 | A1 * | 9/2017 | McCaffrey | F01D 9/04 |
| 2017/0350268 | A1 | 12/2017 | McCaffrey | |
| 2018/0156068 | A1 * | 6/2018 | Roussille | F01D 11/08 |
| 2018/0347586 | A1 * | 12/2018 | Kwak | F02C 3/06 |
| 2020/0003066 | A1 * | 1/2020 | Clark | F01D 25/005 |

FOREIGN PATENT DOCUMENTS

| | | | | |
|---|---|---|---|---|
| GB | 839325 | | 6/1960 | |
| WO | WO-2014046735 | A1 * | 3/2014 | F01D 5/28 |
| WO | 2015191174 | | 12/2015 | |

OTHER PUBLICATIONS

Partial EP Search Report for EP Application No. 20159623.6 dated May 20, 2020.

* cited by examiner

BOAS CARRIER WITH DOVETAIL ATTACHMENTS

BACKGROUND

This application relates to a blade outer air seal carrier having dovetail attachments.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Blade outer air seals have been proposed made of ceramic matrix composite fiber layers.

SUMMARY

In one exemplary embodiment, a blade outer air seal assembly includes a support structure. A blade outer air seal has a plurality of seal segments arranged circumferentially about an axis and mounted in the support structure by a carrier. The carrier has first and second hooks that extend radially outward from a platform along an axial length of the carrier. The first and second hooks are in engagement with the support structure.

In a further embodiment of the above, the first hook extends generally in a first circumferential direction. The second hook extends generally in a second circumferential direction opposite the first circumferential direction.

In a further embodiment of any of the above, the first and second hooks form a dovetail shape for engagement with the support structure.

In a further embodiment of any of the above, the dovetail shape has a ratio of a circumferential width to a radial height of about 3.

In a further embodiment of any of the above, at least a portion of the platform is arranged within a passage of the seal segment.

In a further embodiment of any of the above, the carrier comprises a plurality of carrier segments. Each of the carrier segments are arranged between adjacent seal segments.

In a further embodiment of any of the above, a post extends radially outward from the platform and engages with an edge of the seal segment.

In a further embodiment of any of the above, the post is arranged circumferentially outward of the first and second hooks.

In a further embodiment of any of the above, a channel is arranged between the first and second hooks on the carrier. The channel is configured to accommodate an anti-rotation protrusion extending radially inward from the support structure.

In a further embodiment of any of the above, the channel extends partially through the carrier in an axial direction and terminates at a wall connecting the first and second hooks.

In a further embodiment of any of the above, the wall is near a trailing edge of the carrier.

In a further embodiment of any of the above, a notch is arranged in one of the first and second hooks.

In a further embodiment of any of the above, the notch is configured to permit cooling air to flow in a generally radial direction between the carrier and the segment.

In a further embodiment of any of the above, a tab extends from the platform in a generally radial direction and engages a portion of the seal segment.

In a further embodiment of any of the above, the blade outer air seal has first and second walls that extend from an inner platform and are joined at an outer wall to form a circumferentially extending passage.

In a further embodiment of any of the above, the blade outer air seal is a ceramic matrix composite material.

In a further embodiment of any of the above, the support structure is a metallic material.

In a further embodiment of any of the above, the carrier is a metallic material.

In another exemplary embodiment, a turbine section for a gas turbine engine includes a turbine blade that extends radially outwardly to a radially outer tip and for rotation about an axis of rotation. A blade outer air seal has a plurality of seal segments arranged circumferentially about the axis of rotation. Each of the segments are mounted in a support structure radially outward of the outer tip via a carrier. The carrier has a plurality of carrier segments. Each carrier segment has first and second hooks that extend radially outward from a platform to form a dovetail shape. The first and second hooks are in engagement with the support structure. The platform is arranged within a passage of the seal segment.

In a further embodiment of any of the above, the blade outer air seal is a ceramic matrix composite material. The carrier is a metallic material.

These and other features may be best understood from the following drawings and specification.

DETAILED DESCRIPTION

Figure 1:
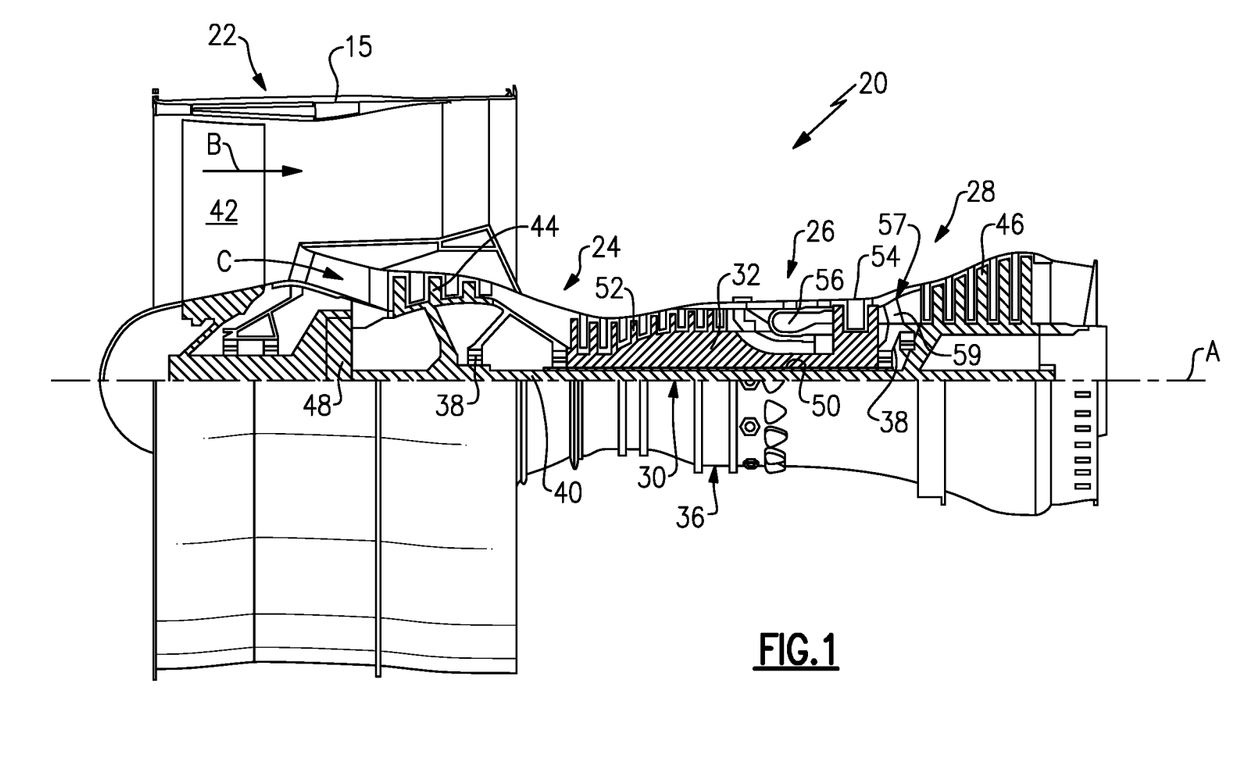
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine engine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
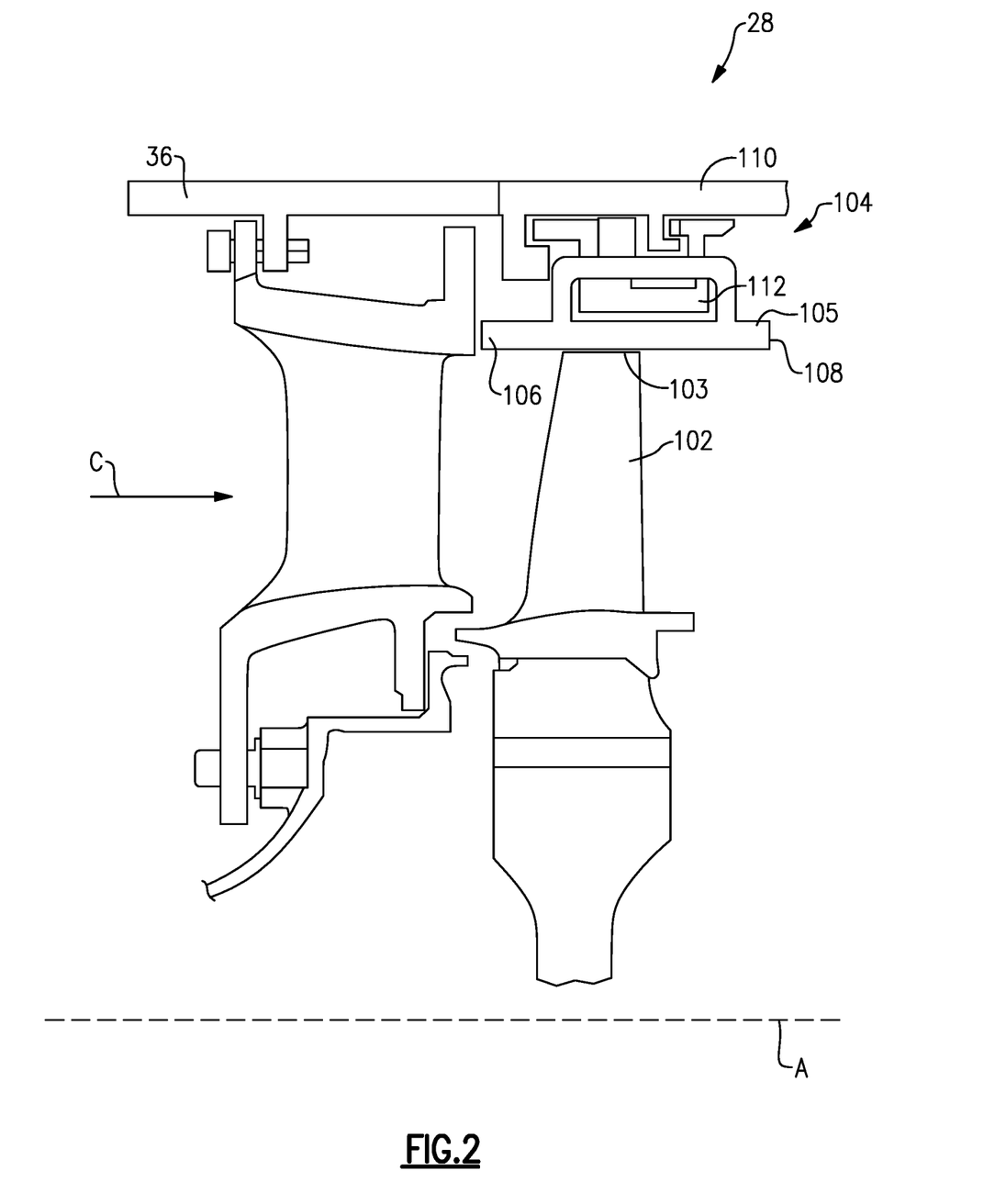
FIG. 2 shows a portion of a turbine section.

FIG. 2 shows a cross section of a portion of an example turbine section 28, which may be incorporated into a gas turbine engine such as the one shown in FIG. 1. However, it should be understood that the turbine section 28 could be utilized in other gas turbine engines, and even gas turbine engines not having a fan section at all.

A turbine blade 102 has a radially outer tip 103 that is spaced from a blade outer air seal ("BOAS") assembly 104. The BOAS assembly 104 may be made up of a plurality of seal segments 105 that are circumferentially arranged in an annulus about the central axis A of the engine 20. The seal segments 105 have a leading edge 106 and a trailing edge 108. The seal segments 105 may be monolithic bodies that are formed of a high thermal-resistance, low-toughness material, such as a ceramic matrix composite ("CMC"). In another embodiment, the seal segments 105 may be formed from another material, such as monolithic ceramic or a metallic alloy. The BOAS segments 105 are mounted to a BOAS support structure 110 via an intermediate carrier 112. The support structure 110 may be mounted to an engine structure, such as engine static structure 36. In some examples, the support structure 110 is integrated with engine static structure 36.

Figure 3:
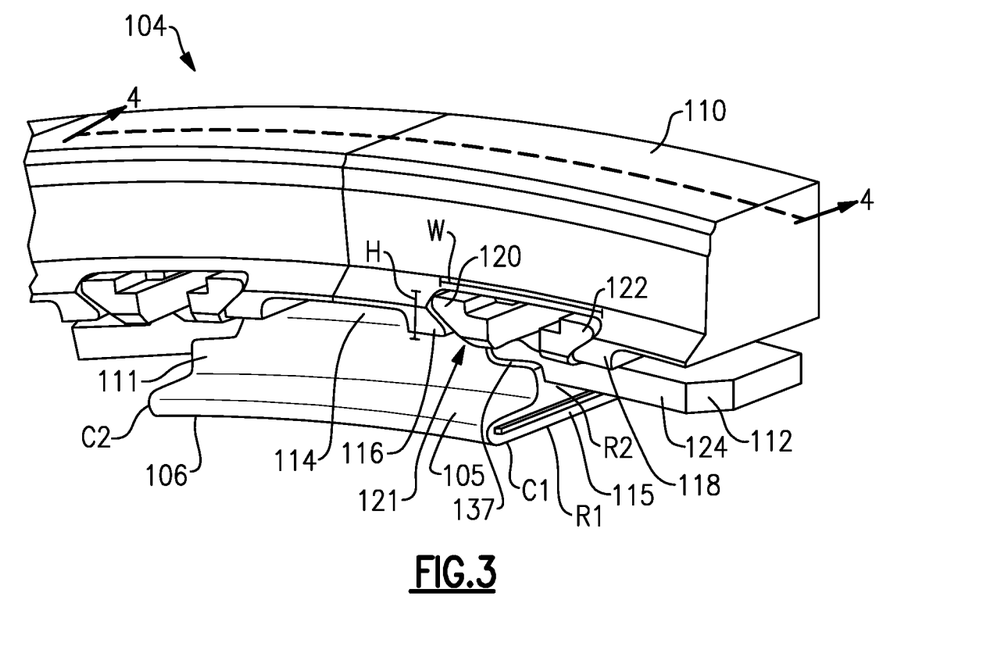
FIG. 3 shows a view of an exemplary blade outer air seal assembly.

FIG. 3 shows an exemplary BOAS assembly 104. The BOAS segment 105 is mounted to the engine 20 via the support structure 110 and intermediate carrier 112. Each seal segment 105 has a platform 115 that defines radially inner and outer sides R1, R2, respectively, and first and second circumferential sides C1, C2, respectively. The radially inner side R1 faces in a direction toward the engine central axis A. The radially inner side R1 is thus the gas path side of the seal segment 105 that bounds a portion of the core flow path C. The leading edge 106 faces in a forward direction toward the front of the engine 20 (i.e., toward the fan 42), and the trailing edge 108 faces in an aft direction toward the rear of the engine 20 (i.e., toward the exhaust end).

The support structure 110 may be a unitary structure or a plurality of segments arranged circumferentially about the engine axis A. The support structure 110 has a plurality of hooks 116, 118 extending radially inward to engage with the intermediate carrier 112.

The intermediate carrier 112 has a circumferentially extending platform 124 having several radial protrusions, such as hooks 120, 122. Hooks 120, 122 extend radially outward from the platform 124 of the carrier 112 to engage the hooks 116, 118 of the support structure 110. The hooks 120, 122 extend along the carrier 112 in the axial direction and hook in opposite circumferential directions to form a dovetail 121. That is, hook 122 curves in a direction towards the first circumferential side C1, while hook 120 curves in a direction towards the second circumferential side C2. The dovetail 121 has a circumferential width W and a radial height H. The dovetail 121 may have an aspect ratio of width W to height H between about 2 and about 4, and in a further embodiment between about 2.5 and about 3.5. In one example, the dovetail 121 has an aspect ratio of the width W to the height H of about 3:1.

In the illustrated embodiment, the seal segment 105 is a loop BOAS segment. That is, the seal segment 105 generally has first and second walls 111, 113 extending radially outward from the platform 115 and joined by an outer wall 114 to form a circumferentially extending passage 130. Edges 136, 137, 138 on the outer wall 114, first wall 111, and second wall 113, respectively (shown in FIGS. 5-6), provide surfaces for engagement with the carrier 112.

In this embodiment, the seal segment 105 is formed of a ceramic matrix composite ("CMC") material. The BOAS segment 105 is formed of a plurality of CMC laminate plies. The laminates may be silicon carbide fibers, formed into a woven fabric in each layer. The fibers may be coated by a boron nitride. In some embodiments it may be desirable to add additional material to make the laminates more stiff than their free woven fiber state. Thus, a process known as densification may be utilized to increase the density of the laminate material after assembly. Densification includes injecting material, such as a silicon carbide matrix material, into spaces between the fibers in the laminate plies. This may be utilized to provide 100% of the desired densification, or only some percentage. One hundred percent densification may be defined as the layers being completely saturated with the matrix and about the fibers. One hundred percent densification may be defined as the theoretical upper limit of layers being completely saturated with the matrix and about the fibers, such that no additional material may be deposited. In practice, 100% densification may be difficult to achieve. Although a CMC loop BOAS segment 105 is shown, other BOAS arrangements may be utilized within the scope of this disclosure.

Figure 4:
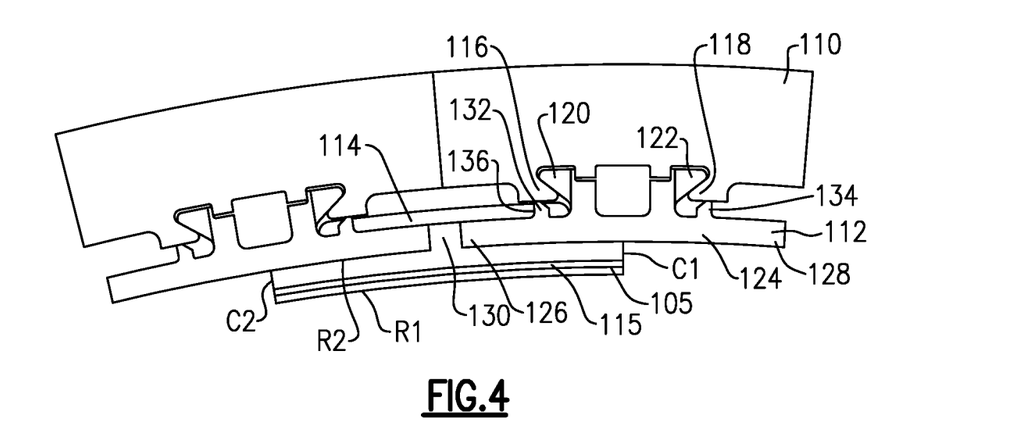
FIG. 4 shows a cross-section of the exemplary blade outer air seal assembly of FIG. 3.

FIG. 4 is a cross-sectional view of the blade outer air seal assembly of FIG. 3 taken along line 4-4. The platform 124 of the intermediate carrier 112 has a first end portion 126 and a second end portion 128. The first and second end portions 126, 128 are configured to engage with the seal segment 105. In this example, the seal segment 105 is a loop BOAS defining a circumferentially extending passage 130. The end portions 126, 128 are inserted within the passage 130. First and second posts 132, 134 are arranged on either side of the first and second hooks 120, 122 for engagement with the seal segment 105. For example, the posts 132, 134 abut an edge 136 of the BOAS passage 130 when the carrier 112 is assembled with a seal segment 105. The posts 132, 134 may help radially contain the carrier 112 and prevent rotation of the seal segment 105.

Figure 5:
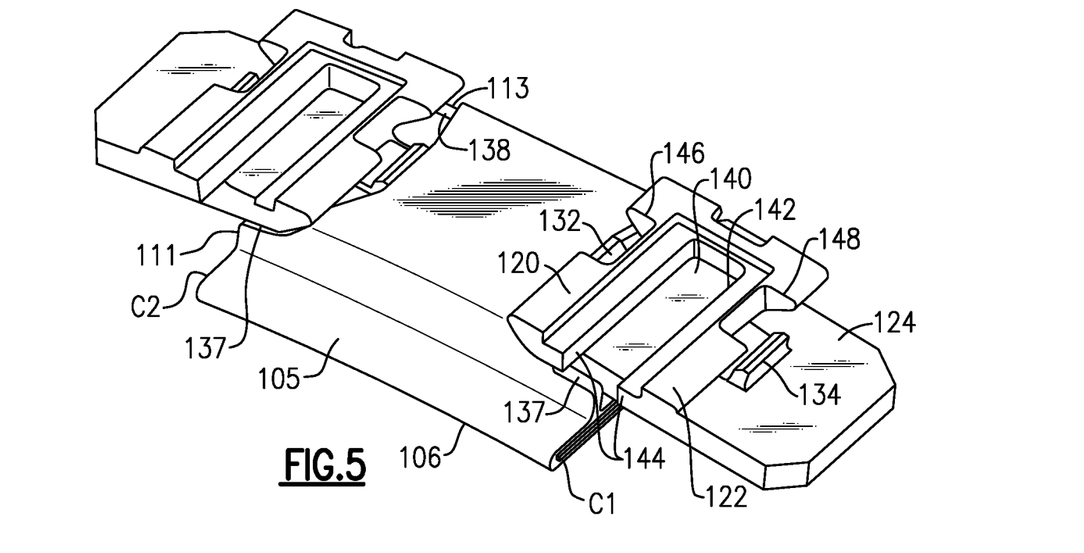
FIG. 5 shows a portion of the exemplary blade outer air seal assembly.

FIG. 5 shows a view of the carrier 112 and BOAS segment 105. An axially extending passage 140 is arranged between the first and second hooks 120, 122. The passage 140 extends a portion of the axial length of the carrier 112 from the leading edge to a wall 142 near the trailing edge. The passage 140 provides weight reduction for the carrier 112. The passage 140 also engages with anti-rotation tabs on the support structure 110 (shown in FIGS. 8-9). The passage 140 may have a shoulder 144 for accommodating different anti-rotation features of the support structure 110.

The first and second hooks 120, 122 may have first and second notches 146, 148, respectively. The first and second notches 146, 148 extend radially through the first and second hooks 120, 122. The first and second notches 146, 148 may permit cooling air to flow radially inward to the seal segment 105. The first and second notches 146, 148 may also provide tooling access to the platform 124 to form posts 132, 134. In one example, the posts 132, 134 are milled into the carrier 112, and the notches 146, 148 permit tooling to form the posts 132, 134.

Figure 6:
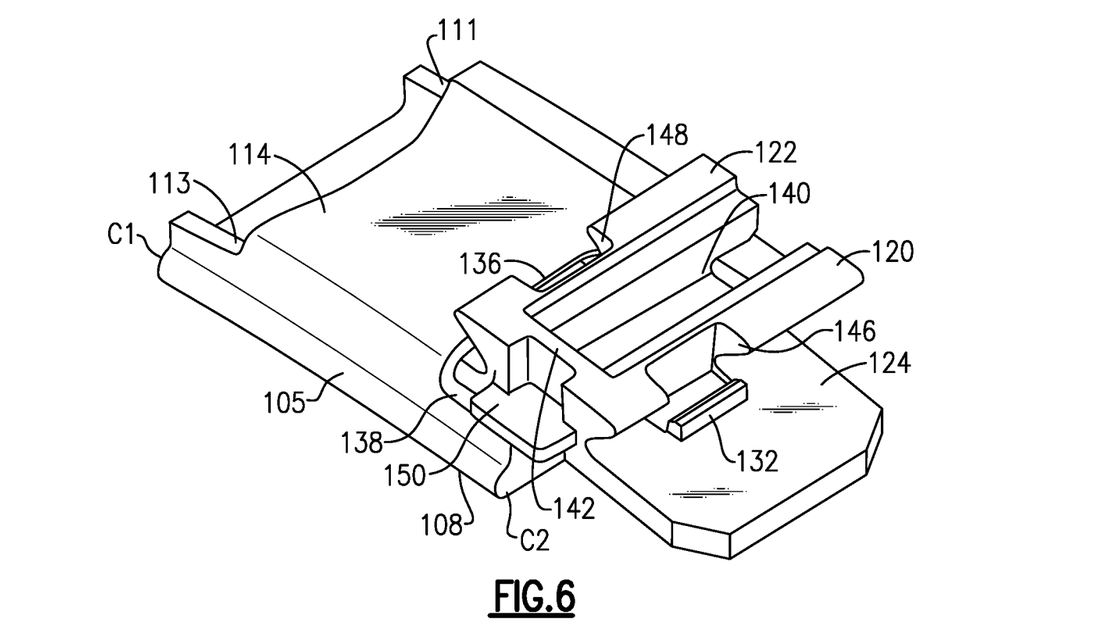
FIG. 6 shows a portion of the blade outer air seal assembly.

FIG. 6 shows another view of the carrier 112 and BOAS segment 105. A tab 150 extends radially outward from the platform 124. The tab 150 may be near the trailing edge 108 of the seal segment 105. The tab 150 engages with an edge 138 of the seal segment 105, and provides an axial load-bearing surface. The first and second hooks 120, 122 may engage with an edge 137 of the seal segment 105 to provide an axial load-bearing surface near the leading edge 106.

Figure 7:
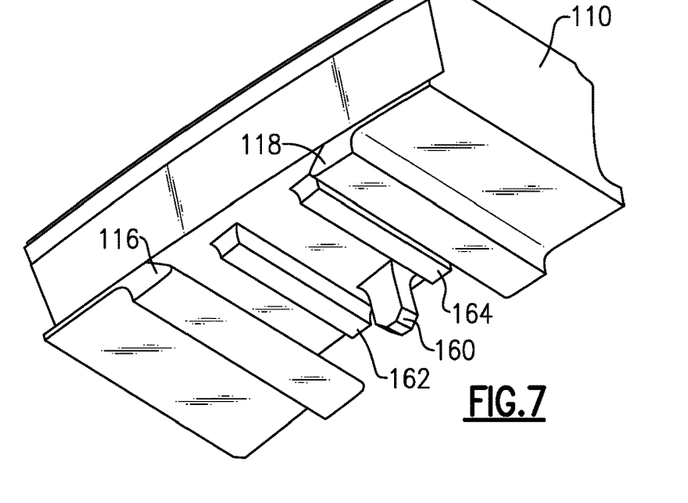
FIG. 7 shows a portion of the exemplary blade outer air seal assembly.

FIG. 7 shows the support structure 110. The first and second hooks 116, 118 are arranged to accept the dovetail shaped hooks 120, 122 of the carrier 112. An anti-rotation tab 160 extends radially inward from the support structure 110 between the first and second hooks 116, 118. The anti-rotation tab 160 provides the radially inner-most portion of the support structure 110. The anti-rotation tab 160 is arranged toward the trailing edge of the support structure 110. Protrusions 162, 164 may also extend radially inward from the support structure 110 between the first and second hooks 116, 118. The protrusions 162, 164 extend in a radial direction for at least a portion of the axial length of the support structure 110.

Figure 8:
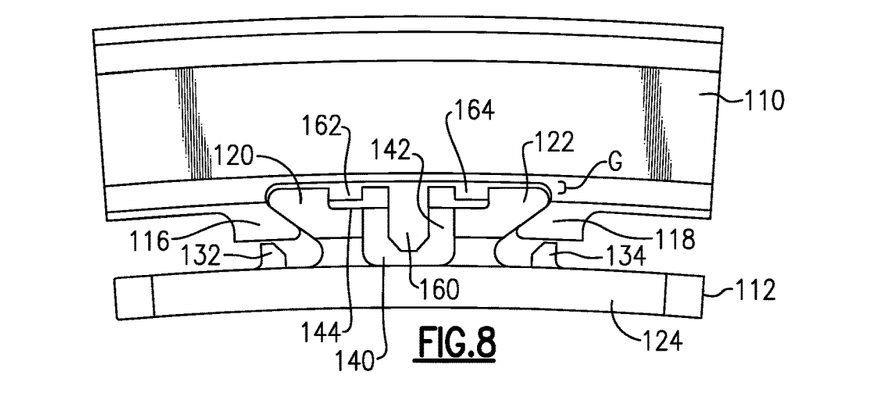
FIG. 8 shows a portion of the exemplary blade outer air seal assembly.

As shown in FIG. 8, the protrusions 162, 164 engage with the shoulder 144 of the passage 140. A gap G in the radial direction may be formed between the support structure 110 and the carrier 112. This gap G permits some movement in the radial direction. The posts 132, 134 may limit the amount of movement in the radial direction by contacting the first and second hooks 116, 118 of the support structure 110.

Figure 9:
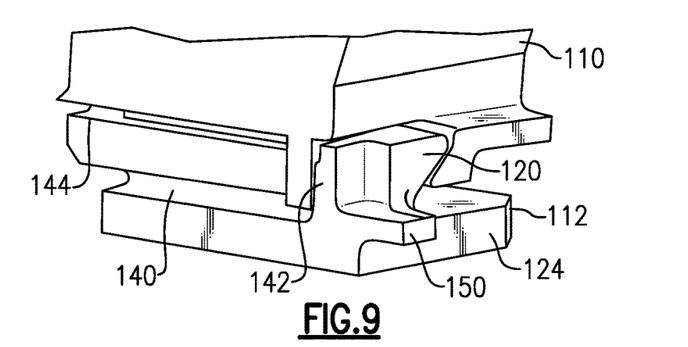
FIG. 9 shows a portion of the exemplary blade outer air seal assembly.

FIG. 9 shows a cross-sectional view of a portion of the support structure 110 and carrier 112. The anti-rotation tab 160 abuts the wall 142 of the carrier 112, which prevents rotation of the carrier 112 relative to the support structure 110. The anti-rotation tab 160 is centered between the hooks 120, 122 and thus is centered on each seal segment 105 in the circumferential direction. The anti-rotation tab 160 may further support radial loads from the BOAS segment 105 or the carrier 112. The anti-rotation tab 160 also prevents the carrier 112 from being assembled incorrectly, such as backwards.

The disclosed support structure 110 and carrier 112 having a dovetail arrangement permits a greater hook solidity. Hook solidity refers the contact area of the hooks, and in particular to a ratio of the arc length of the hooks 120, 122 on the carrier 112 to the total arc length of the carrier 112. For example, if a length of the carrier 112 in the circumferential direction is 10 inches (254 mm), and the combined hook arc length of the hooks 120, 122 is 4 inches (101.6 mm) (i.e., each hook 120, 122 is 2 inches (50.8 mm)), the carrier will have a hook solidity of 40%. Known axially assembled BOAS carriers may have a hook solidity of about 40% shared between rows of leading edge and trailing edge hooks. The disclosed axially extending dovetail hook arrangement permits a greater hook solidity, which provides a more stable assembly 104. The example carrier 112 and support structure 110 arrangement provides a hook solidity of greater than 40%. In one embodiment, the hook solidity is between about 40% and about 70%. In a further embodiment, the carrier 112 and support structure 110 have a hook solidity of about 50%.

The dovetail arrangement of the support structure 110 and carrier 112 enables larger contact areas between the carrier 112 and the support structure 110 than known axially-facing hooks. This arrangement may improve BOAS carrier stability. The dovetail arrangement also permits axial assembly of the entire BOAS assembly. The carrier 112 and support structure 110 permit the use of a ceramic BOAS, which is not as ductile as metallic materials. The ability to use ceramic BOAS promotes a more stable assembly.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A blade outer air seal assembly, comprising:
   a support structure;
   a blade outer air seal having a plurality of seal segments arranged circumferentially about an axis and mounted in the support structure by a carrier;
   wherein the carrier has first and second hooks extending radially outward from a platform along an axial length of the carrier, the first and second hooks in engagement with the support structure, wherein the first hook extends generally in a first circumferential direction, and the second hook extends generally in a second circumferential direction opposite the first circumferential direction; and
   wherein a post extends radially outward from the platform and engages with an edge of the support structure.

2. The blade outer air seal assembly of claim 1, wherein the first and second hooks form a dovetail shape for engagement with the support structure.

3. The blade outer air seal assembly of claim 2, wherein the dovetail shape has a ratio of a circumferential width to a radial height of about 3.

4. The blade outer air seal assembly of claim 1, wherein at least a portion of the platform is arranged within a passage of the seal segment.

5. The blade outer air seal assembly of claim 1, wherein the carrier comprises a plurality of carrier segments, each of the carrier segments arranged between adjacent seal segments.

6. The blade outer air seal assembly of claim 1, wherein the post is arranged circumferentially outward of the first and second hooks.

7. The blade outer air seal assembly of claim 1, wherein a channel is arranged between the first and second hooks on the carrier, the channel configured to accommodate an anti-rotation protrusion extending radially inward from the support structure.

8. The blade outer air seal assembly of claim 7, wherein the channel extends partially through the carrier in an axial direction and terminates at a wall connecting the first and second hooks.

9. The blade outer air seal assembly of claim 8, wherein the wall is near a trailing edge of the carrier.

10. The blade outer air seal assembly of claim 1, wherein a notch is arranged in one of the first and second hooks.

11. The blade outer air seal assembly of claim 10, wherein the notch is configured to permit cooling air to flow in a generally radial direction between the carrier and the seal segment.

12. The blade outer air seal assembly of claim 1, wherein a tab extends from the platform in a generally radial direction and engages a portion of the seal segment.

13. The blade outer air seal assembly of claim 1, wherein the blade outer air seal has first and second walls extending from an inner platform and joined at an outer wall to form a circumferentially extending passage.

14. The blade outer air seal assembly of claim 1, wherein the blade outer air seal is a ceramic matrix composite material.

15. The blade outer air seal assembly of claim 1, wherein the support structure is a metallic material.

16. The blade outer air seal assembly of claim 1, wherein the carrier is a metallic material.

17. A turbine section for a gas turbine engine, comprising:
   a turbine blade extending radially outwardly to a radially outer tip and for rotation about an axis of rotation;
   a blade outer air seal having a plurality of seal segments arranged circumferentially about the axis of rotation, each of the seal segments mounted in a support structure radially outward of the outer tip via a carrier;
   wherein the carrier has a plurality of carrier segments, each carrier segment having first and second hooks extending radially outward from a platform to form a dovetail shape, the first and second hooks in engagement with the support structure, and the platform is arranged within a passage of the seal segment; and
   wherein a post extends radially outward from the platform and engages with an edge of the support structure.

18. The turbine section of claim 17, wherein the blade outer air seal is a ceramic matrix composite material and the carrier is a metallic material.

19. The blade outer air seal assembly of claim 13, wherein at least a portion of the platform is arranged within the circumferentially extending passage, the blade outer air seal is a ceramic matrix composite material and the carrier is a metallic material.

20. A blade outer air seal assembly, comprising:
   a support structure securable to an engine static structure;
   a carrier securable to the support structure;
   a blade outer air seal having a plurality of seal segments arranged circumferentially about an axis and mounted in the support structure by the carrier;
   wherein the carrier includes a platform and first and second carrier hooks engageable with the support structure to secure the carrier, the first and second carrier hooks extend radially outward from the platform and extend along an axial length of the carrier with respect to the axis such that the first and second carrier hooks are circumferentially spaced apart from each other with respect to the axis;
   the first carrier hook extends generally in a first circumferential direction, and the second carrier hook extends generally in a second circumferential direction opposite the first circumferential direction with respect to the axis;

the support structure includes a first support hook and a second support hook circumferentially spaced apart from each other with respect to the axis to establish a dovetail;

the first and second carrier hooks engage the first and second support hooks along the dovetail to mount the carrier to the support structure;

the carrier includes a first post and a second post circumferentially spaced apart from the first post with respect to the axis;

the first post extends radially outward from the platform with respect to the axis such that the first post engages with a radially inward face of the first support hook; and the second post extends radially outward from the platform with respect to the axis such that the second post engages with a radially inward face of the second support hook.

21. The blade outer air seal assembly of claim 20, wherein:

the first post and the first carrier hook cooperate to capture the first support hook; and the second post and the second carrier hook cooperate to capture the second support hook.

22. The blade outer air seal assembly of claim 21, wherein the first and second carrier hooks circumferentially space apart the first and second posts from each other with respect to the axis.

23. The blade outer air seal assembly of claim 20, further comprising:

an anti-rotation protrusion extending radially inward from the support structure with respect to the axis; and wherein a channel is established circumferentially between the first and second carrier hooks with respect to the axis, and the channel is dimensioned to receive the anti-rotation protrusion.

24. The blade outer air seal assembly of claim 20, wherein each of the plurality of seal segments comprises a ceramic matrix composite material, and the carrier comprises a metallic material.

* * * * *